United States Patent
Engelhardt et al.

(10) Patent No.: US 6,262,375 B1
(45) Date of Patent: Jul. 17, 2001

(54) ROOM TEMPERATURE DIELECTRIC HTSC CABLE

(75) Inventors: John S. Engelhardt, Greenwich, CT (US); Steven A. Boggs, Toronto (CA)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 07/950,187

(22) Filed: Sep. 24, 1992

(51) Int. Cl.$^7$ .................................................. H01B 12/16

(52) U.S. Cl. ..................... 174/125.1; 174/15.5; 505/704; 505/886

(58) Field of Search .................................. 174/15.4, 15.5, 174/125.1, 126.4; 505/1, 884, 885, 886, 887

(56) References Cited

U.S. PATENT DOCUMENTS

| | | | |
|---|---|---|---|
| 3,301,937 | * | 1/1967 | Burnier et al. ............................ 505/1 |
| 3,502,783 | * | 3/1970 | Aupoix et al. ...................... 174/15.5 |
| 3,600,498 | * | 8/1971 | Aupoix et al. ...................... 174/15.5 |
| 3,657,467 | * | 4/1972 | Matthaus et al. ................... 174/15.5 |
| 3,730,966 | * | 5/1973 | Aupoix et al. ...................... 174/15.5 |
| 3,749,811 | * | 7/1973 | Bogner et al. ...................... 174/15.5 |
| 4,039,740 | * | 8/1977 | Iwata .................................. 174/15.5 |
| 4,845,308 | * | 7/1989 | Womack, Jr. et al. ............. 174/15.4 |

FOREIGN PATENT DOCUMENTS

| | | | |
|---|---|---|---|
| 0103814 | * | 4/1990 | (JP) .................................. 174/125.1 |
| 0109211 | * | 4/1990 | (JP) .................................. 174/125.1 |
| 32108 | * | 2/1992 | (JP) .................................. 174/125.1 |

OTHER PUBLICATIONS

"Superconducting Power Transmission: Wouldn't You Rather Switch to DC?", William E. Keller, Seventh Annual Transmission and Substation Design and Operation Symposium, Arlington, Texas, Sep. 26–27, 1974.*

"Wave Propagation in a DC Superconducting Cable, Part II: Parametric Effects", P. Chowdhuri et al., IEEE Trans. Power Apparatus and Systems, vol. PAS–100, No. 2, Feb. 1981.*

"Application Considerations for HTSC Power Transmission Cables," Engelhardt et al., Fifth Annual Conference on Superconductivity and Applications, NYSIS, Buffalo, N.Y., Sep. 24–26, 1991.*

"The Brookhaven Superconducting Underground Power–Transmission System," Forsyth, *Electronics & Power,* May 1984, pp. 383–384.*

"The 60 Hz Performance of Superconducting Power Transmission Cables Rated for 333 MVA per Phase," Forsyth, IEEE/PES 1984 Winter Meeting, pp. 1–3.*

"Prospects Offered by New High Critical Temperature Superconducting Materials for Electrical Power Transmission", Deschamps et al., 1990 CIGRE Conf. "Impact of Superconducting Technology on the Future Power Systems Technology", Aug. 26–Sep. 1, 1990.*

* cited by examiner

Primary Examiner—Hyung-Sub Sough
(74) Attorney, Agent, or Firm—Frommer Lawrence & Haug, LLP; William S. Frommer

(57) ABSTRACT

A high temperature superconducting cable comprises a cryogenic core, with a superconducting material either inside the cryogenic core or wrapped around the core. A space maintained at a vacuum and functioning as a cryostat surrounds the core; within this space are a separator and superinsulation. A conventional dielectric at room temperature surrounds the superinsulation, and a conventional ground shield surrounds the conventional dielectric. This cable does not require a cryogenic dielectric and is of suitable size and nature to be used in retrofitting conventional cable pipes.

12 Claims, 4 Drawing Sheets

ROOM TEMPERATURE DIELECTRIC HTSC CABLE

BACKGROUND OF THE INVENTION

This invention relates to high voltage power cables, more particularly, to a high voltage electric power cable including a superconducting conductor, and a cable dielectric which operates at room temperature.

A power transmission system typically includes a generator located in a remote area, a transformer to raise the voltage and lower the current output of the generator, a transmission line or cable to transfer the power to a load which is located in a developed area, a substation to receive the transmitted power and transform it from high voltage to a lower distribution voltage and send it out over many distribution lines to customers. The power transmitted is the product of the current and voltage. Alternating current (AC) transmission is characterized by voltages of 69 kV to 765 kV while direct current (DC) transmission is generally in the range of 100 kV to 600 kV.

Large amounts of power may be transmitted using either an overhead line or an underground cable. An overhead line is typically a bare conductor using the ambient air as its dielectric, while an underground cable typically has one or more conductors surrounded by a dielectric which is in turn surrounded by a ground shield that provides a well defined electric field configuration, thereby ensuring the power arrives at its destination. An underground cable is about ten times more expensive to install than an overhead line, so underground cables are used only where community or aesthetic considerations render overhead lines inappropriate. A typical use for high voltage underground cables is as a link between the terminus of overhead lines from a remote generator at the edge of a city and a substation serving the city.

Most transmission cable systems in North America include three insulated conductor assemblies within a steel pipe which contains a dielectric fluid, such as mineral oil or synthetic oil, for example, Dichevral™ 100, pressurized to approximately 200 psig. Each conductor assembly includes a large conductor, such as copper or aluminum, having a cross section in the range of 500 mm$^2$ to 2000 mm$^2$, which is surrounded by carbon-impregnated paper to provide a smooth electrical transition to a dielectric consisting of dielectric fluid impregnated paper or paper polypropylene laminate. The dielectric is further surrounded by carbon impregnated paper and a conductive shield, such as a taped metallic shield, at ground potential. Skid wires with D-shaped cross section are wound in a spiral around the ground shield to protect a length of cable, typically 0.25 to 1 km, while it is pulled in the steel pipe.

Cable conductors, such as copper and aluminum, have electrical resistance, and cable dielectrics have dielectric losses, all resulting in substantial amounts of heat being generated per unit length of cable. The laminar or extruded dielectric between the cable conductor and the conductive ground shield has limited ability to operate at high temperatures. The ultimate limit on the power transfer of a power cable system is normally the maximum allowable temperature of the cable dielectric, above which the operating life of the cable degrades rapidly. A power cable system is designed so that at its rated power, the heat generated by the cable can be dissipated safely into the soil in which the cable is buried without exceeding the maximum allowable temperature for the cable dielectric. One or more cables are typically located inside a pipe which is in a deep trench backfilled with a mixture selected for its high thermal conductivity, such as certain compacted crushed stones or sand mixtures.

Approximately sixty percent of the cost of an initial installation of an underground cable system is due to the costs of installing the cable pipe in the ground, including trenching, handling and installing of the pipe, and backfilling the trench with thermal backfill.

Many communities are now served by underground power cables that have been in place for decades. Growth in power usage requires increasing the amount of power delivered to such communities. It is highly desirable to retrofit the existing power cable pipes to provide increased capacity, rather than installing new pipes, so as to avoid the majority of the cost associated with the cable system, namely, the costs of installing new cable pipe. If existing pipes are retrofitted, the new cable installed in the pipes must, of course, fit within the diameter of the existing pipes. It is also desirable that the finished assembly be similar in nature to the conventional cable assembly so as to enjoy the benefit of proven experience.

The type of cable used in a cable pipe retrofit depends on the amount and type of increase in power transmission capacity which is desired. If the capacity is to be increased by increasing the voltage levels, conventional non-superconducting cables are sometimes adequate due to improvements in power cable technology during the last few decades. However, if capacity is to be increased by increasing the current carrying capability, a problem arises with the use of conventional cables, namely, existing cable pipe is too small to dissipate the heat generated from a non-superconducting cable having sufficient power transmission capacity. Thus, it is necessary to use a superconducting cable.

In a superconducting cable, the metallic conductor of a conventional cable is replaced with a superconductor that can carry a larger current with a lower loss, in the case of AC transmission, or zero resistive loss in the case of DC transmission. However, the superconductor must be maintained at a temperature low enough to remain superconductive. A cryogen such as liquid helium or liquid nitrogen is a cold material which is able to maintain a superconductor at a sufficiently low temperature for superconduction to occur. The cryogen and superconductor are enclosed within a cryostat which provides thermal insulation from the surrounding environment. Liquid helium at a temperature of 4–10 Kelvin (K) is used for low temperature superconductors (LTSCs), while liquid nitrogen at a temperature of 68–85 K is used for high temperature superconductors (HTSCs). The surrounding environment is considered to be at a room temperature of 300 K.

Superconducting cable designs having only one superconductor suffer losses due to eddy currents and circulating currents induced in the ground shield by the magnetic field resulting from the high current and also by interaction with magnetic fields created by other superconductors that are in close proximity such as in a three-phase transmission system. LTSCs which operate in liquid helium incur a severe cost penalty because these losses must be removed by the cryogen.

This problem was solved by using a superconductor for the outer shield of the cable so as to confine the magnetic field to the space between the superconductors and eliminate the driving force for eddy currents and circulating currents in the outer metallic parts of the cable. Both superconductors had to be maintained at low temperatures. Consequently, the dielectric between the superconductors also had to function at the low temperature, that is, a cryogenic dielectric was required. Cost and space considerations resulted in the placement of the coaxial superconductors and the cryogenic dielectric therebetween in one large cryostat.

A liquid helium impregnated dielectric was maintained in a supercritical state so as to avoid the formation of bubbles of gas, caused by boiling, which have a lower dielectric breakdown strength than liquids.

HTSC cable is much less costly than LTSC cable, mainly due to savings in refrigeration costs. For instance, to remove one watt of heat from a superconducting cable requires about 250–500 watts of refrigeration power for a LTSC cable but only about 10–15 watts of refrigeration power for a HTSC cable.

Conventional LTSC designs had to be coaxial, and thus, had to use a cryogenic dielectric to reduce losses to an absolute minimum because of the high energy costs of removing heat caused by losses.

The cryostat used in LTSC designs is large, cumbersome and relatively difficult, thus relatively costly, to retrofit into existing pipes. A cable with a flexible cryostat surrounding three coaxial cables and utilizing the maximum available space within an existing pipe results in very large assemblies that cannot practically be transported in long lengths comparable to conventional practice.

Materials suitable for operation at low temperatures as a dielectric required for the implementation of a coaxial design have not been successfully demonstrated. Therefore, the introduction of a superconducting cable system requiring a cryogenic dielectric is not practical at this time and awaits establishment of the viability of such a cryogenic dielectric.

Thus, there is a need for a superconducting cable that can operate with a well established dielectric, although such a cable might not be optimally efficient.

OBJECTS AND SUMMARY OF THE PRESENT INVENTION

It is an object of the present invention to provide a power transmission cable which transmits substantially greater power than conventional cables used in a conventional cable pipe.

It is another object of the present invention to provide a HTSC power transmission cable.

It is further object of the present invention to provide a HTSC power transmission cable suitable for use in cable pipe retrofits.

It is yet another object of the present invention to provide a HTSC power transmission cable compatible with cable dielectrics used in conventional non-superconducting power cables.

It is still another object of the present invention to reduce the life cycle cost of a power transmission cable system.

It is yet a further object of the present invention to provide a HTSC cable system which is thermally stable under typical power system operating conditions.

In accordance with an aspect of the present invention, a high temperature superconducting (HTSC) electrical transmission cable comprises a core, HTSC material concentrically disposed on the core and operable as a current conductor for the cable, a cylinder of thermally superinsulating material disposed in an atmosphere of sub-standard pressure and overlying the HTSC material, a dielectric cylinder concentrically overlying and spaced from the cylinder of thermally superinsulating material, a conductive cylindrical shield disposed over the dielectric cylinder, and means for supplying a cryogenic fluid to flow through the core.

BRIEF DESCRIPTION OF THE DRAWINGS

The following detailed description, given by way of example and not intended to limit the present invention solely to the embodiments shown and described herein, will best be understood in conjunction with the following drawings in which.

DETAILED DESCRIPTION OF THE PREFERRED EMBODIMENTS

Figure 1:
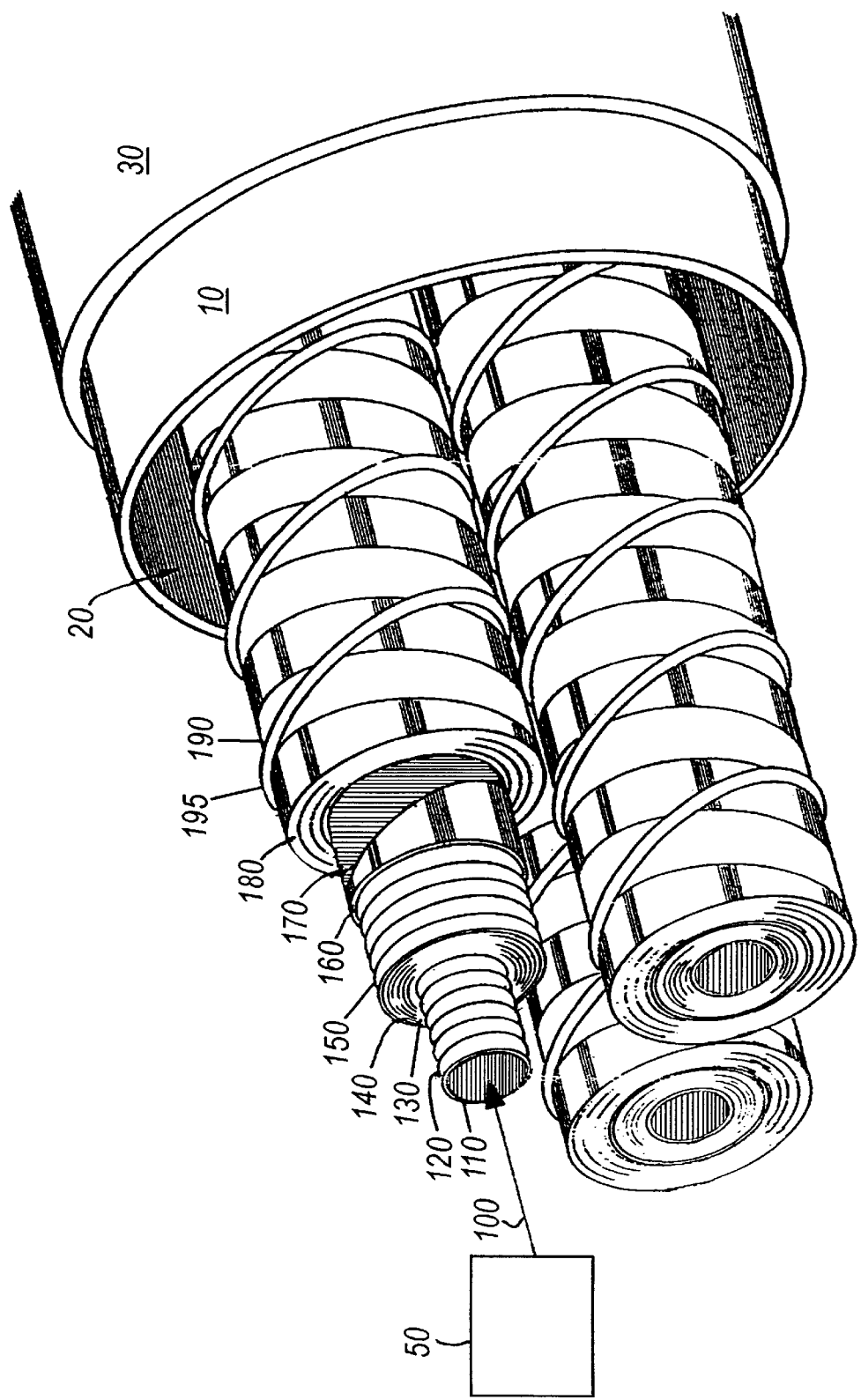
FIG. 1 is an isometric view of a first embodiment of a power transmission system according to the present invention.

Referring now to the drawings, and in particular to FIG. 1, there is illustrated a power transmission system according to the present invention. The apparatus illustrated in FIG. 1 is adapted to hold three cable assemblies within an outer pipe 10, usually formed of carbon steel, and having a pipe coating 30 on the outside thereof. The pipe 10 is hollow, and contains a gas or oil pressurized to about 200 psig which surrounds the conductor assemblies. Each cable assembly corresponds to a respective AC phase of a typical three phase power distribution system.

Figure 2:
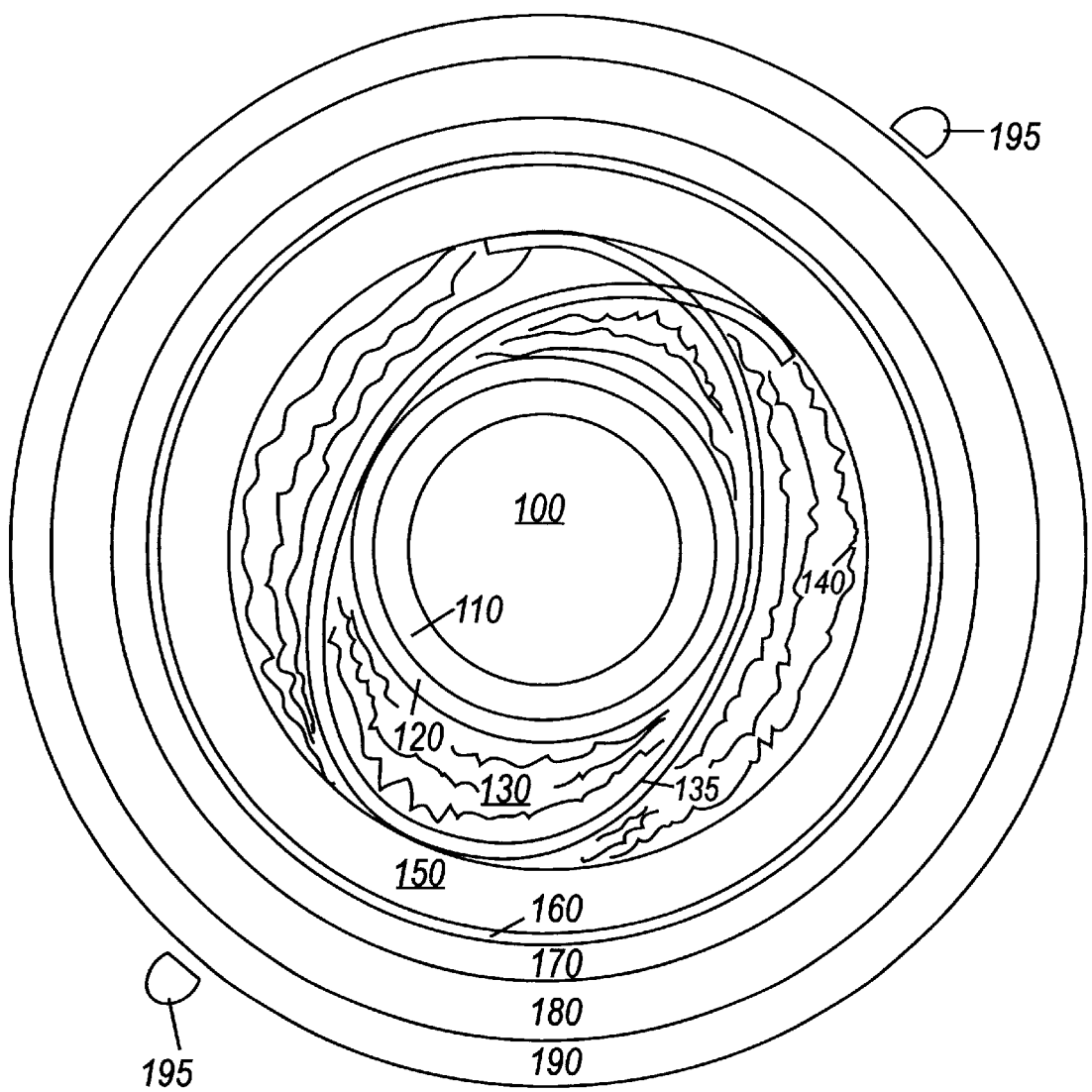
FIG. 2 is a cross-sectional view of one of the cables in the system of FIG. 1.

FIG. 2 is a cross-sectional view of one of the cables in the system of FIG. 1. Each cable assembly includes a corrugated tube 110 having a diameter of about 25 mm and formed of a thermally conducting material such as copper, or aluminum, having a thickness of about 3 mm. The corrugation supports contraction when the cable assembly is cooled and provides flexibility. The inside of the tube 110 is hollow, forming a duct through which a cryogen 100, such as liquid nitrogen $LN_2$, flows under a pressure of, for example, 200 psig. At higher temperatures, other cryogens could be used. A pump 50 is adapted to supply the cryogen 100 to the cable assembly.

While the optimum power transmission efficiency is achieved by maintaining the superconductor at a temperature of about one-third of its critical temperature, at which it becomes non-superconducting, the present invention preferably maintains the superconductor at a temperature of about two-thirds of its critical temperature, for economic reasons. Of course, this is not a limitation of the present invention and improvements in refrigeration technology would alter this cost versus performance tradeoff.

A superconducting material 120 is formed on the outside of tube 110 by conventional methods such as chemical vapor deposition, painting, laser ablation or sputtering, followed by appropriate conventional chemical, mechanical and thermal processing. Alternatively, the superconductor 120 may be in the form of a superconducting wire or tape which is fixed to the outside of tube 110 in a manner which provides good thermal and electrical contact, such as soldering. Appropriate materials for the paint include CNC-03 from CeraNova Corp. of Hopkinton, Mass.; while appropriate materials for the tape include ASC-OX19 from American Superconductor Corp. of Watertown, Mass. The superconductor 120 is maintained at a superconducting temperature by cryogen 100, and acts as a current conductor. The corrugation of tube 110 lets the superconductor bend without undue stress. The tube 110 and superconductor 120 are also in electrical contact.

The tube 110 acts as a conducting stabilizer for superconductor 120. For example, if lightning should strike an overhead line in series with the underground cable shown in FIG. 1, a short circuit will form between the overhead line and ground. A large current, perhaps 50,000 amps, is drawn through the power transmission system to the short. Since a typical superconducting cable has a critical current of about 5,000 to 20,000 amperes above which it becomes non-superconducting, i.e., resistive, the large current drawn to the short cannot go through the superconductor without damage thereto. When the resistance of the superconductor increases above that of tube 110, the large current flows through tube 110, instead of the superconductor, since tube 110 has a lower resistance. The tube 110, acting as a backup current conductor, prevents damage to the superconductor due to excessive heating. Thus, the present invention provides a HTSC cable system which is thermally stable under typical power system operating conditions.

A feature of the present invention is increased heat capacity of the cryogenic system relative to an LTSC. This feature results from the fundamental physical law that the heat capacity of all materials goes to zero at 0 K. As a result, the heat capacity of materials at 80 K is much greater than at 4 K. One result of the increased heat capacity of the cryogenic system of the present invention is greatly reduced temperature rise caused by a current.

The outside of tube 110 having superconductor 120 formed thereon comprises an inner wall of a cryostat having a flexible structure, while corrugated tube 150 comprises the outer wall of the cryostat. Corrugated tube 150 is preferably formed of a low conductivity alloy such as stainless steel "SS 104". Tube 150 also forms another backup current conductor, although a poor conductor, since it is thin and highly resistive to avoid eddy current losses from the current flowing through the superconductor. The corrugation of tubes 110 and 150 provides flexibility which results in easier installation. Instead of being corrugated, one or both of tubes 110 and 150 may be formed of an inherently flexible material such as certain copper alloys, for example, those used in the manufacture of copper tubing. Tubes 110 and 150 define a space 130 at a sub-standard pressure, preferably a vacuum which minimizes the transfer of heat between the cryostat walls.

Space 130 contains a thermally superinsulating material 140 such as layers of metallized mylar, which is preferably crinkled mylar. Alternatively, the mylar can be flat and separated by a lacelike material having a high thermal resistance. Material 140 provides cryogenic insulation.

Space 130 also contains a separator 135 which is adapted to physically separate the walls of the cryostat. Separator 135 is shown in FIG. 2 as a conventional spring-like structure helically wound about the superconductor 120, touching both the inner and outer wall of the cryostat. Alternatively, separator 135 may be teflon on edge, bent to spiral around the inner assembly. Separator 135 is preferably a structure of low thermal conductivity.

A thin layer of stainless steel tape 160 is on the outside wall of tube 150 because it is undesirable to have a paper dielectric, discussed below, be adjacent to the corrugated surface of tube 150. Tape 160 is applied in an open spiral interculated with a plain paper or a carbon black semiconducting paper tape 170. If tube 150 is not corrugated, then tape 160 may be omitted. Tapes 160 and 170 are features of a conventional non-superconducting cable.

A conventional paper dielectric 180 forms a cylinder around tape 170. Dielectric 180 may be a dielectric fluid impregnated paper or a dielectric fluid impregnated paper polypropylene laminate. Alternatively, an extruded polymer such as cross linked polyethylene (XLPE) or thermoplastic polyethylene, or a synthetic rubber such as ethylene propylene rubber (EPR) or ethylene propylene diene modified (EPDM), which is a type of EPR, can be used. If an extruded dielectric is employed, tapes 160 and 170 are replaced with a compatible semi-conducting extruded layer, discussed below.

It is an important feature of the present invention that dielectric 180 is a conventional dielectric at room temperature, since this eliminates the need for a cryogenic dielectric. Furthermore, dielectric 180 may be formed of proven materials. Thus, a power transmission system according to the present invention may be constructed using known materials. It is also easier to use a power cable according to the present invention in a retrofit, since conventional cable technology is used from tape 170 outwards.

A conventional conductive shield 190 at ground potential forms a cylinder around dielectric 180.

Conventional skid wires 195 are wrapped around shield 190. During installation, the function of the skid wires 195 is to reduce friction between the cable assembly and an inner pipe tube 20. During power transmission, the function of the skid wires 195 is to provide an electrical contact between the pipe and the shield 190, as well as between shields 190 of adjacent cable assemblies. In an AC system, frequent connections between the shields 190 of adjacent cable assemblies are desirable to reduce shield currents and corresponding losses. The skid wires 195 may be hollow to reduce eddy current loss.

If a cable according to the present invention is used in an initial installation, rather than a retrofit, it is preferable that pipe 10 be formed of stainless steel, rather than carbon steel, so as to reduce pipe losses by about half. The loss from the conductor of a superconducting cable is absorbed by the cryogen, rather than the surrounding soil, so the amount of heat required to be dissipated by the pipe due to losses in the dielectric and in the pipe is smaller than the heat dissipation requirement of a conventional cable.

Figure 3:
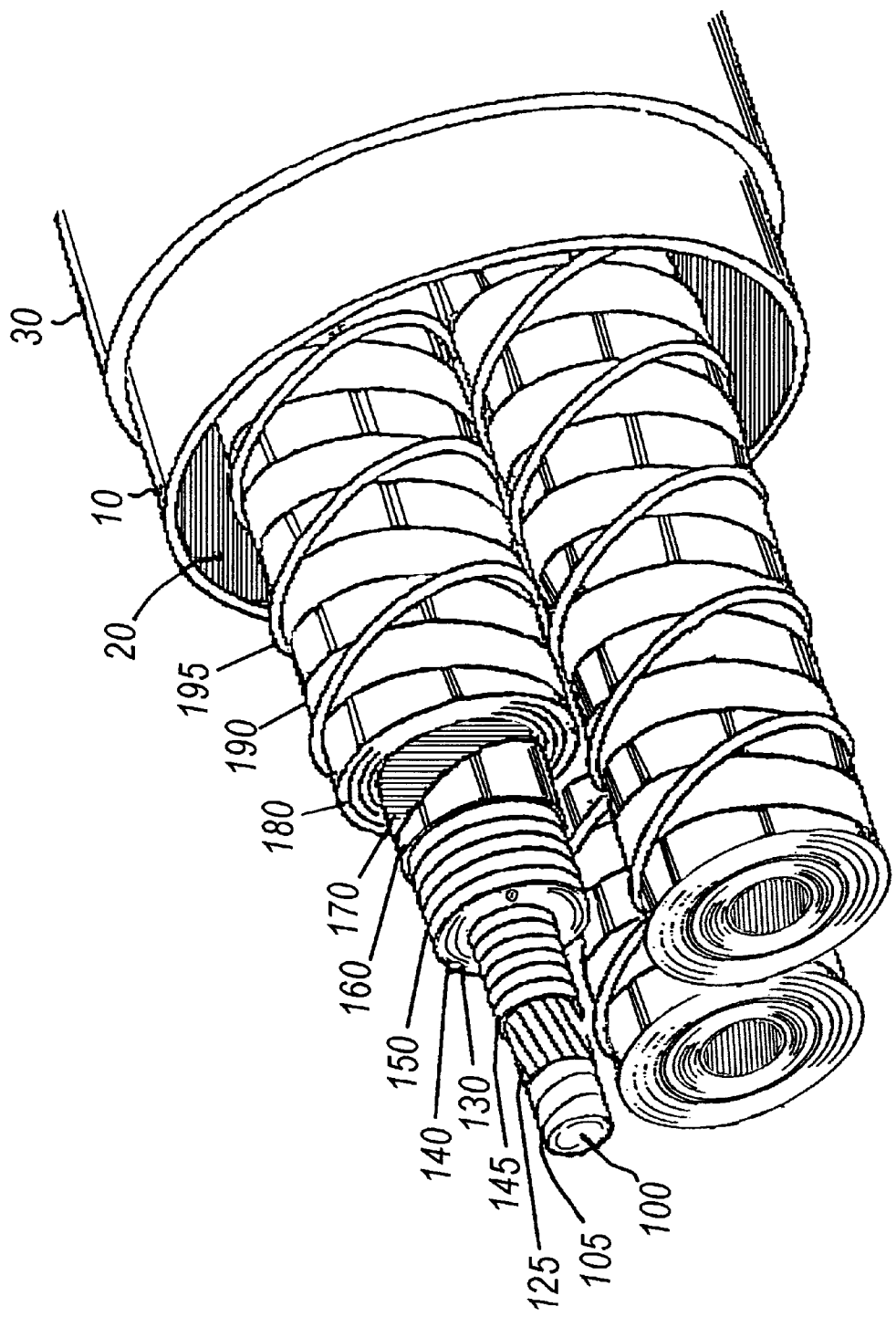
FIG. 3 is an isometric view of a second embodiment of a power transmission system according to the present invention.

FIG. 3 shows another embodiment of a power transmission system according to the present invention. The apparatus in FIG. 3 includes a pipe 10, inner pipe tube 20, pipe coating 30, pump 50, cryogen 100, space 130, separator 135 (not visible), superinsulation 140, cryostat outer wall 150, stainless steel tape 160, carbon black impregnated tape 170, dielectric 180, shield 190 and skid wire 195 which were discussed above in connection with FIGS. 1 and 2, and so a description thereof is omitted in the following discussion, for brevity.

The apparatus in FIG. 3 also includes a forming core 105, superconducting tape 125, and cryostat inner wall 145. Core 105 is a spiral former made of metal or plastic which supports the overlying tapes wires of superconducting material. Former 105 may be formed of spirally wound tape, for flexibility. Former 105 is within the cryogen channel.

Superconducting tape 125 contains a superconductor, such as a lead stabilized bismuth based material, which is clad with silver. The silver cladding may act as a backup current conductor if the superconductor becomes resistive, although it is preferred to avoid relying on such a backup, because the silver is thin to reduce its cost. While copper may be bonded over the silver for improved conductivity, the resulting tape would be more costly. Tape 125 is a practical way of forming a superconducting current conductor. Superconductor 125 is located at a more radially central position of the cable than the cryogen channel which is radially outside the superconductor 125.

Cryostat inner wall 145 is a corrugated tube surrounding superconductor 125 and is adapted to separate the cryogen 100 maintained at high pressure from the evacuated thermally insulating space 130.

Figure 4:
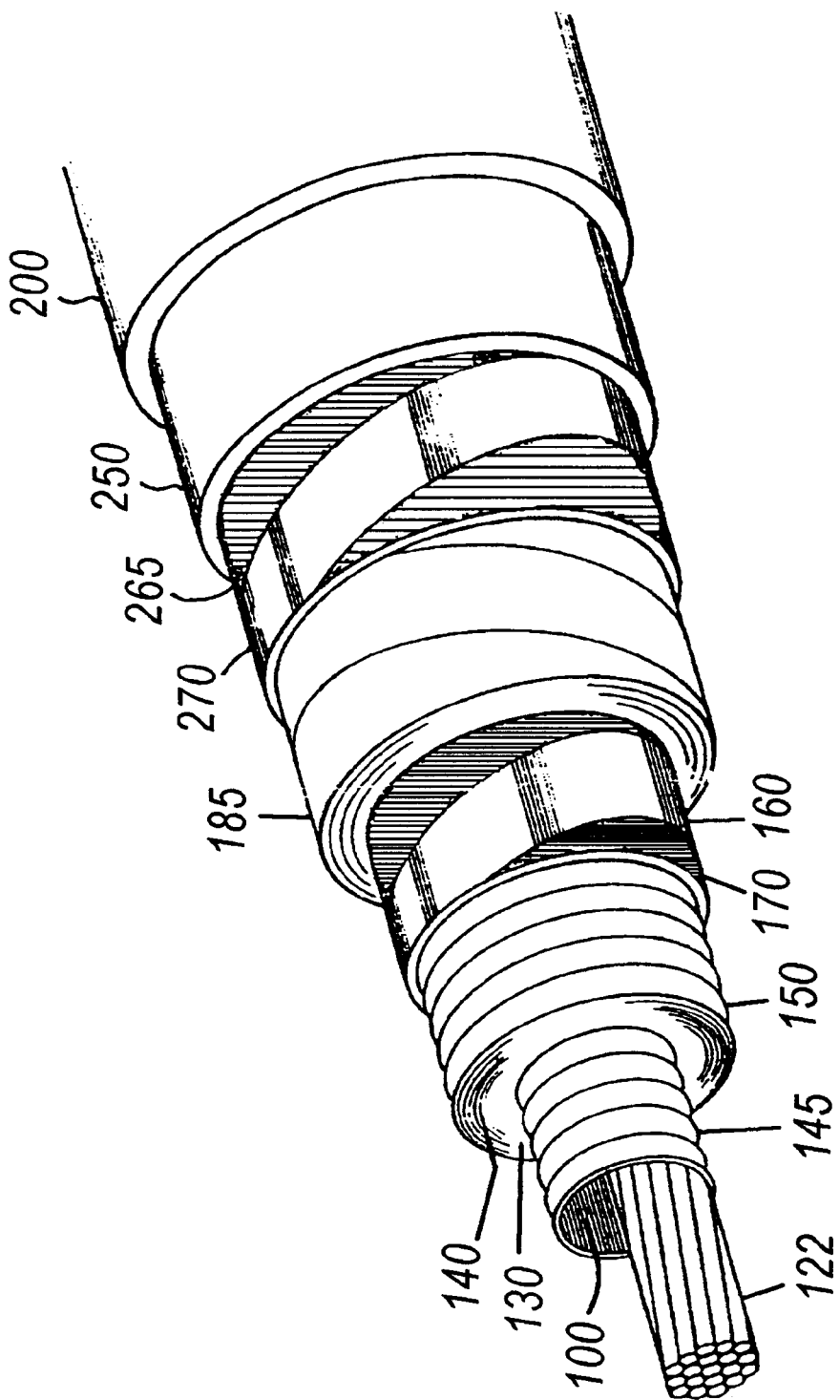
FIG. 4 is an isometric view of a third embodiment of a power transmission system according to the present invention.

FIG. 4 shows a third embodiment of a power transmission system according to the present invention. The apparatus in FIG. 4 is suitable for DC transmission which typically uses two bipolar conductors at potentials of equal magnitude but opposite polarity. Each of the two identical cable assemblies 401, 402 shown in FIG. 4 is self-contained, that is, it may be placed in the ground "as is", installed in conduits or ducts or in a pipe filled with oil. Each of the cables is hermetically sealed, and does not require use of a pressure source.

Each cable assembly 401, 402 shown in FIG. 4 comprises a cryogen 100, a superconducting wire or tape bundle 122, a space 130, thermally superinsulating material 140, an inner cryostat tube 145, an outer cryostat tube 150, stainless steel tape 160, carbon black impregnated tape 170, a dielectric 185, stainless steel tape 265, carbon black impregnated tape 270, a sheath 250 and a jacket 200.

Superconducting wire or tape bundle 122 may be formed of respective superconducting tapes such as ASC-OX19 available from American Superconductor Corp. in Watertown, Mass., which comprises a lead stabilized bismuth based superconductor clad with silver having a critical temperature of about 110 K.

Tapes 265 and 270 function comparably to tapes 160 and 170, although in the outer shielding system.

Sheath 250 is an hermetic lead sheath at ground potential adapted to keep oil inside the cable and water outside the cable. Cable jacket 200 is adapted to protect sheath 250 from corrosion, and may be formed of neoprene, PVC or polyethylene. If the cable is installed in a pipe filled with oil, sheath 250 and jacket 200 may be omitted.

Dielectric 185 is at a substantially uniform temperature, since, in contrast with a conventional cable, dielectric 185 is not heated by losses from the conductor. Therefore, dielectric 185 can be thinner than the corresponding dielectric in a conventional cable, because it is under less stress.

More specifically, a conventional dielectric fluid impregnated paper used as the cable dielectric has a large negative temperature coefficient of resistivity. In a conventional cable, the cable dielectric is at a much higher temperature near the conductor than near the ground shield, resulting in a higher electric field in the dielectric near the conductor than near the ground shield. When a conventional cable is subject to a voltage surge of opposite polarity from that with which the cable is energized, the surge grades capacitively with higher stress at the conductor than at the ground shield, substantially increasing the electric field in the dielectric. This is in contrast to normal operation of a DC cable in which the higher temperature at the conductor causes a higher electrical stress at the ground shield.

In contrast, the dielectric in a cable according to the present invention grades in substantially the same manner as a capacitively graded system with higher electrical stress at the conductor so that a reverse polarity surge does not result in an anomalous stress in the dielectric.

The installation of the cable assemblies within a pipe is not essential to the present invention. The electrical insulation may be provided by a triple extrusion over the outer cryostat wall. Such triple extrusion may consist of a first semi-conducting layer such as Union Carbide HFDA 0800 Black 55 EC over a second layer consisting of a thermoplastic polyethylene or XLPE such as Union Carbide HFDE 4201 NTEC, and a third layer consisting of a semi-conductor such as that used for the first layer. The polymer compound is covered with a ground shield assembly which is impermeable to moisture.

The underground thermal limit of a conventional 345 kV cable is about 750 megavoltamperes (MVA), corresponding to a current of about 1250 amperes, whereas a superconducting cable according to the present invention has an underground thermal limit of about 1800 MVA at 345 kV, corresponding to a current of about 3000 amperes, approximately 2.4 times that of a state-of-the-art conventional cable.

The present invention is not restricted to two or three cable assemblies per pipe. More cable assemblies may be located in one pipe to permit transfer of power with an increased number of phases.

The relationship of the inner and outer tubes of the cryostat is not necessarily concentric. In some cases, it is desirable to incorporate clearance between the helically applied separator and the inner and outer corrugated tubes, which results in a large reduction in the thermal contact of the separator with each of the tubes since the inner tube will be in the bottom of the space formed and touch only where the helical separator crosses underneath. This results in an eccentric assembly. In other cases, the separator is more suitably formed with a tight fit, causing the tubes to be concentric.

In an apparatus according to the present invention, only the heat in-leak and the AC and eddy current losses in the superconductor assembly load the refrigerator. Dielectric losses and ohmic losses in the cable shields and enclosure are conducted to the earth; they do not have to be removed by the refrigeration system, reducing the system energy requirements so that the distance between cooling plants for a given channel diameter may be increased relative to that of a superconducting cable having a cryogenic dielectric. This greatly reduced refrigeration effort makes the use of a non-coaxial design viable with a HTSC cable. Furthermore, thermal contraction phenomena are limited primarily to the HTSC conductor and the inner wall of the cryostat, so that the mass of material requiring cooling is greatly reduced in comparison to a cryogenic dielectric cable, thus simplifying service procedures and reducing down time. Also, installation is according to conventional practice, except for splicing of the conductor assembly. The terminations are essentially conventional since the thermal insulation is not exposed to the voltage gradient.

The present invention provides a power transmission cable which transmits substantially greater power than conventional cables used in a conventional cable pipe due to the use of a superconductor as the current conductor, so that none of the current conduction losses typically present in an AC superconducting power cable are dissipated into the soil surrounding the cable pipe, permitting a greater amount of power to be transferred through a cable system of predetermined size than is possible using a conventional cable. A typical DC superconducting power cable has no such losses.

The present invention provides a HTSC power transmission cable suitable for use in cable pipe retrofits because of its use of a room temperature conventional dielectric and because of its small diameter resulting from placement of the cryogen at the core.

The present invention reduces the life cycle cost of a power transmission system by permitting the pipe to be installed in a smaller trench having little or no expensive thermal backfill, and avoiding the costs of removing the soil which was replaced with the thermal backfill in the prior art.

Although illustrative embodiments of the present invention, and various modifications thereof, have been described in detail herein with reference to the accompanying drawings, it is to be understood that the invention is not limited to these precise embodiments and that various changes and further modifications may be effected therein by one skilled in the art without departing from the scope or spirit of the invention as defined in the appended claims.

What is claimed is:

1. A high temperature superconducting (HTSC) electrical transmission cable comprising: a core; HTSC material concentrically disposed on said core and operable as a first current conductor for said cable; a cylinder of thermally superinsulating material disposed in an atmosphere of sub-standard pressure and overlying said HTSC material; a dielectric cylinder concentrically overlying and spaced from said cylinder of thermally superinsulating material; a conductive cylindrical shield disposed over said dielectric cylinder; and means for supplying a cryogenic fluid to flow through said core.

2. The HTSC cable of claim 1 wherein said dielectric cylinder is comprised of oil-impregnated paper-polypropylene laminate dielectric.

3. The HTSC cable of claim 1 further comprising said cryogenic fluid within said core and wherein said cryogenic fluid is liquid nitrogen.

4. The HTSC cable of claim 1 further comprising inner and outer cylindrical cryostat walls between which said cylinder of thermally superinsulating material is disposed.

5. A high temperature superconducting (HTSC) AC pipe-type electrical transmission cable having a pipe and plural cable assemblies disposed within said pipe each cable assembly corresponding to a respective AC phase and each cable assembly comprising: a core; HTSC material concentrically disposed on said core and operable as a first current conductor for the respective cable assembly; a cylinder of thermally superinsulating material disposed in an atmosphere of sub-standard pressure and overlying said HTSC material; a dielectric cylinder concentrically overlaying and spaced from said cylinder of thermally superinsulating material; a conductive cylindrical shield disposed over said dielectric cylinder; and means for supplying a cryogenic fluid to flow through said core.

6. The HTSC cable of claim 5 further including a high pressure insulating fluid disposed within said pipe and surrounding each of said cable assemblies.

7. The HTSC cable of claim 5 wherein said dielectric cylinder consists essentially of oil-impregnated paper polypropylene.

8. The HTSC cable of claim 5 wherein only said HTSC material carries an electrical current.

9. The HTSC cable of claim 5 further comprising inner and outer corrugated cylindrical cryostat walls formed of electrically conductive material both of which are electrically connected to said HTSC material and between which is disposed said cylinder of thermally superinsulating material.

10. A high temperature superconducting (HTSC) DC electrical transmission cable comprising: a core; plural HTSC conductors disposed within said core; a cylinder of thermally superinsulating material disposed in an atmosphere of sub-standard pressure and disposed on said core; a paper dielectric cylinder concentrically overlying and spaced from said cylinder of thermally superinsulating material; a conductive cylindrical shield disposed over said paper dielectric cylinder; and means for supplying a cryogenic fluid to flow through said core.

11. The HTSC DC cable of claim 10 wherein said cryogenic fluid is liquid nitrogen.

12. The HTSC DC cable of claim 10 further comprising inner and outer cylindrical cryostat walls between which said thermally superinsulating material is disposed.

* * * * *